US007672864B2

(12) United States Patent
Nair et al.

(10) Patent No.: US 7,672,864 B2
(45) Date of Patent: Mar. 2, 2010

(54) GENERATING AND DISPLAYING LEVEL-OF-INTEREST VALUES

(75) Inventors: Rahul Nair, Atlanta, GA (US); Kurt Piersol, Santa Cruz, CA (US); Bradley Rhodes, Palo Alto, CA (US); Ame Elliott, San Francisco, CA (US); Kim McCall, Menlo Park, CA (US); Stephen R. Savitzky, San Jose, CA (US)

(73) Assignee: Ricoh Company Ltd., Tokyo (JP)

( * ) Notice: Subject to any disclaimer, the term of this patent is extended or adjusted under 35 U.S.C. 154(b) by 1431 days.

(21) Appl. No.: 10/754,907

(22) Filed: Jan. 9, 2004

(65) Prior Publication Data

US 2005/0154637 A1 Jul. 14, 2005

(51) Int. Cl.
*G06F 17/30* (2006.01)

(52) U.S. Cl. ...................................................... 705/10
(58) Field of Classification Search .................. 705/10
See application file for complete search history.

(56) References Cited

U.S. PATENT DOCUMENTS

| | | | | |
|---|---|---|---|---|
| 5,226,177 | A * | 7/1993 | Nickerson | 725/24 |
| 5,430,786 | A * | 7/1995 | Komatsu et al. | 378/45 |
| 5,778,108 | A * | 7/1998 | Coleman, Jr. | 382/305 |
| 5,907,322 | A * | 5/1999 | Kelly et al. | 725/51 |
| 6,239,801 | B1 | 5/2001 | Chiu et al. | |
| 6,321,228 | B1 * | 11/2001 | Crandall et al. | 707/10 |
| 6,366,296 | B1 | 4/2002 | Boreczky et al. | |
| 6,480,852 | B1 * | 11/2002 | Himmel et al. | 707/10 |
| 6,560,281 | B1 | 5/2003 | Black et al. | |
| 6,585,521 | B1 * | 7/2003 | Obrador | 434/236 |
| 6,587,506 | B1 | 7/2003 | Noridomi et al. | |
| 6,636,238 | B1 * | 10/2003 | Amir et al. | 715/730 |
| 6,640,218 | B1 * | 10/2003 | Golding et al. | 707/2 |
| 6,956,593 | B1 * | 10/2005 | Gupta et al. | 715/751 |
| 7,146,416 | B1 * | 12/2006 | Yoo et al. | 709/224 |
| 7,298,930 | B1 * | 11/2007 | Erol et al. | 382/305 |
| 2002/0054083 | A1 | 5/2002 | Boreczky et al. | |
| 2002/0069218 | A1 | 6/2002 | Sull et al. | |
| 2002/0161804 | A1 * | 10/2002 | Chiu et al. | 707/530 |
| 2002/0163532 | A1 * | 11/2002 | Thomas et al. | 345/723 |
| 2003/0086691 | A1 * | 5/2003 | Yu | 386/69 |
| 2004/0034653 | A1 * | 2/2004 | Maynor et al. | 707/102 |
| 2004/0153504 | A1 * | 8/2004 | Hutchinson et al. | 709/204 |
| 2004/0169683 | A1 * | 9/2004 | Chiu et al. | 345/776 |

(Continued)

OTHER PUBLICATIONS

Bargeron, David et al., Annotations for streaming video on the Web: system design and usage studies Computer Networks, vol. 31, No. 1999.*

(Continued)

*Primary Examiner*—Scott L Jarrett
(74) *Attorney, Agent, or Firm*—Fenwick & West LLP

(57) ABSTRACT

Attendees or viewers of a presentation provide input marking specific points corresponding to a high level of interest. Received bookmarks are aggregated to generate overall level-of-interest values for various points in the presentation. A graphical depiction of these level-of-interest values is provided; users can navigate using this graphical depiction to find specific parts of the presentation having the highest level of interest or importance. User interface elements provide access to various filtering, display, and configuration options for the graphical depiction.

47 Claims, 12 Drawing Sheets

U.S. PATENT DOCUMENTS

2004/0250478 A1* 12/2004 McDonald et al. ............. 52/11
2005/0010409 A1* 1/2005 Hull et al. ................... 704/243
2005/0071865 A1* 3/2005 Martins ....................... 725/10

OTHER PUBLICATIONS

He, Liwei et al., Auto-sumarization of Audo-Viedo Presentations ACM 1999.*
Stifleman, Lisa et al., The Audio Notebook CHI 2001, Mar.-Apr. 2001, vol. 3, No. 1.*
Riedman, Patricia, Yahoo! taps users to build new Buzz Index Advertising Age, Oct 30, 2000. vol. 71, No. 45.*
Smoothing Algorithm Defintion Wikipedia.org, Retrieved Jun. 3, 2008.*
Stifelman, Lisa J. Augmenting Real-World Objects: A Paper-Based Audio Notebook Chi'96, 1996.*
Nair, Rahul, Rahul Nair's Projects Retrieved from http://www.rahulnair.net/loi.html Jun. 2, 2008.*
Nair, Rahul, Calculation of an Aggregated Level of Interest: Function for Recorded Events MM'04, ACM 2004.*
Roschelle, Jeremy et al., VideoNoter: A productivity tool for video data analysis Behavior Research Methods, Instruments & Computers, vol. 23, No. 2, 1991.*
Kulsch, Mathias et al., Improving Speaker Training with Interactive Lectures ED Media Conference, Jun. 2003.*
Bargeron, David et al., Annotations from streaming video on the Web: system design and usage studies Computer Networks, vol. 31, 1999.*
A worm's turn too far for great debate Evening Post, New Zealand, Sep. 2, 1998.*
MOran, Thomas P. et al., I'll Get That Off the Audio: A Case Study of Salvaging Multimedia Meeting Records Proceedings of CHI'97, 1997.*
Chiu, Patrick et al., NoteLook: Taking Notes in Meetings with Digital Video and Ink in Proc. ACM Intl. Conf. On Multimedia, 1999.*
Minneman, Scott et al., A Confederation of Tools Capturing and Accessing Collaborative Activity ACM Multimedia, 1995.*
Wilcox, Lynn D. et al., DYNOMITE: A Dynamically Organized Ink and Audio Notebook Proceedings of the SIGCHI conference on Human factors in computing systems, 1997.*
"Interclipper, Realtime Video Organizer" [online], Copyright 2002 DocuMat, LLC, 12 Pages, [retrieved Dec. 15, 2003]. Retrieved from the Internet: <http://www.interclipper.com/functions.html>.
Richard C. Davis, Jason A. Brotherton, James A. Landay, Morgan N. Price and Bill N. Schilit, "NotePals, Lightweight Note Taking by the Group, for the Group," EECS Department, University of California, College of Computing, Georgia Institute of Technology and FX Palo Alto Laboratory, pp. 1-8.
Liwei He, Elizabeth Sanocki, Anoop Gupta and Jonathan Grudin, "Auto-Summarization of Audio-Video Presentations," Microsoft Research, Redmond, WA, 10 pages.
Scott L. Minneman and Steve R. Harrison, "Making and Using Near-Synchronous, Pre-Narrative Video," Xerox Palo Alto Research Center, Palo Alto, CA, 9 Pages.
Karon Weber and Alex Poon, "Marquee: A Tool for Real-Time Video Logging," Human Factors in Computing Systems, Xerox Palo Alto Research Center; CHI '94, Boston, MA, Apr. 24-28, 1994, pp. 58-64.

* cited by examiner

Automatically generated Touchverse message

Automatically generated SMIL file view

United States Patent US 7,672,864 B2

GENERATING AND DISPLAYING LEVEL-OF-INTEREST VALUES

FIELD OF THE INVENTION

The present invention relates generally to recording and indexing media items, and more specifically to techniques for generating level-of-interest values for various parts of a recording, based on the input of attendees, viewers, or listeners.

BACKGROUND OF THE INVENTION

Technology exists for recording meetings, presentations, television shows, sporting events, and the like. In many situations, a viewer of such a recording, or media item, would like to identify and navigate to specific sections that are of interest, without having to watch the entire recording.

When viewing or listening to a video or audio recording of a presentation or other stored, temporally linear media item, it is often difficult and time-consuming to find those portions of the recording that are of particular interest. Unlike text-based or image-based media, such recordings are difficult to parse effectively so as to skip unimportant sections and identify important sections.

Viewers can speed-search when watching a recording, in order to view the video portion at increased speed; typically, however, the audio portion is silenced during speed-search operations (and in any case would generally be undecipherable if it weren't silenced). For presentations consisting primarily of one or more individuals talking, the subject matter being discussed is not readily discernable from the visual component of the recording. In such situations, speed-searching is of little use in quickly navigating to interesting sections.

In addition, even when the visual component does reveal something about the subject matter being discussed (for example if a presentation includes overhead projection of slides), it can still be rather time-consuming for a viewer to speed-search through a lengthy recording, or several recordings, at a speed that is slow enough to be able to interpret the visual component and ascertain the subject matter being discussed. Furthermore, speed-searching in such a manner requires undivided concentration on the part of the viewer, so as not to miss a slide or other visual component in the fleeting moment it appears on the screen.

Manual generation of an index is possible. For example, conventional DVDs usually provide a chapter index that allows a viewer to skip to a particular section that is of interest. An on-screen menu and/or printed insert accompanying the disc provide chapter titles, still frames, and/or other information about each indexed chapter, so as to assist the viewer in determining which section to watch. However, such indexes are manually, not automatically, generated.

Transcription of a recording yields a scannable text representation that can be associated, for example via real-time counter values, with the original recording. A user can skim the transcription, identify the section of interest, and then navigate to that section in the recording. In some cases, the transcription itself may provide sufficient information that the user need not even consult the original recording. However, such transcriptions often omit important information (such as visual components accompanying the dialogue, including gestures, demonstrations, and the like); furthermore, creating and indexing a transcription often must be done manually.

Some prior art systems attempt to deduce which sections of a recording are of interest by analyzing noise levels, sound localizations, scene changes, and the like. Some systems detect events such as silences, applause, slide transitions, and the like. Systems employing such technology are described, for example, in Girgensohn et al., U.S. Pat. No. 6,366,296, entitled "Media Browser Using Multimodal Analysis" and Girgensohn et al., U.S. patent application Publication No. 2002/0054083A1, entitled "Media Browser Using Multimodal Analysis."

Often, however, such measurable characteristics of the recording are unreliable and inaccurate in terms of their ability to successfully identify sections of importance or interest. For example, an increase in noise level can result from the laughter following a joke told by the speaker, or it can indicate applause at the introduction of a new speaker, or shuffling during a break, or a heated discussion, or any of a number of other events, some of which are of interest and some of which are not. Interesting sections of the presentation may be relatively quiet, as the audience watches raptly. Indexing based on noise levels or similar measurable metrics thus fails to accurately reflect the level of interest of any given section of the recording.

Generally, existing methods of identifying sections of interest are either inaccurate or too time-consuming and impractical to be employed for large quantities of recordings of routine presentations, meetings, and the like. As a result, useful information that is buried within video and audio recordings often goes unwatched and is effectively irretrievable.

Interclipper, available from DocuMat LLC of Newark, N.J., allows users to bookmark significant sections of a video recording by clicking a button. Several individuals can bookmark highlights of the same event and then retrieve their own highlights separately using specially coded markers. There is no indication, however, that Interclipper performs any type of collating of bookmarks, so as to generate an overall level-of-interest metric for various sections of the recording. See also L. He et al., "Auto-Summarization of Audio-Video Presentations," in Proc. Multimedia '99, 1999.

Minneman, S. L. and Harrison, S. R., "Where Were We: Making and Using Near-Synchronous Pre-Narrative Video," Proc. ACM Multimedia (MM'93), August 1993, Anaheim, USA, pp. 207-214, describes a system that allows an attendee to add annotations in real time during a presentation, but does not process or collate the annotations.

K. Weber and A. Poon, "Marquee: A Tool for RealTime Video Logging," Proc. CHI 94, ACM Press, New York, 1994, pp. 58-64, describes a pen-based video logging tool that allows users to take notes in real time during a presentation and associate the notes with a video stream recording of the presentation. However, Marquee does not provide functionality for collating or combining annotations made by multiple users to generate a level-of-interest metric.

Chiu et al., U.S. patent application Publication No. US2002/0161804A1, entitled "Internet-Based System for Multimedia Meeting Minutes" describes a note-taking system that is capable of synchronizing entered notes with a multimedia stream, by automatically associating received notations with appropriate portions of the multimedia stream. However, Chiu et al. does not describe techniques for collating or combining annotations made by multiple users to generate a level-of-interest metric.

R. C. Davis et al., "NotePals: Lightweight Note Taking by the Group, for the Group," UC Berkeley Computer Science Division Technical Report UCB//CSD-98-997, describes a collaborative note-taking system that allows multiple users to share their notes. There is no description, however, of any techniques for collating or combining annotations made by multiple users to generate a level-of-interest metric for a presentation.

What is needed is an effective and reliable technique for automatically determining and presenting level-of-interest indicators for a video or audio recording, without requiring manual effort. What is further needed is a technique that allows a viewer to determine what sections of such a recording are of interest, and to easily navigate to such sections. What is further needed is a technique that avoids the limitations of the prior art, as discussed above.

SUMMARY OF THE INVENTION

According to the present invention, attendees of a presentation, and/or other individuals viewing a recording or transmission or the presentation, indicate which sections of the presentation are of particular interest. In one embodiment, attendees make such indications in real-time, while the presentation is in progress.

In one embodiment, attendees mark points in the presentation by clicking a button on a handheld wireless remote control device, or by activating a command on a computer or personal digital assistant (PDA). In another embodiment, additional information can also be entered, such as brief comments, annotations, and/or an indication of a relative level of interest from a number of numeric ratings or along some continuum. In yet another embodiment, an attendee's action (such as taking a note on a laptop, PDA, or digital notepad) causes the current section of the presentation to be marked, so that the marking occurs implicitly without necessarily requiring additional action by the attendee.

The system of the invention collates the entered indications (referred to herein as "bookmarks") from multiple attendees. In one embodiment, the system of the invention generates a graphical depiction indicating a value for a level of interest (LOI) at various points in the presentation. Those points that are deemed more interesting by attendees have a higher LOI value than do other points in the presentation. In particular, the system highlights or indicates those points in the presentation that several attendees bookmarked. Different types of bookmarks can be tracked and collated, for example indicating points relating to particular topics, or points where one or more attendees had a question, comment, or the like.

The user can interact with the graphical depiction to navigate within the recording. For example, the user can click on the graphical depiction at a location corresponding to a section having high level of interest, in order to view (or save, or transmit) that section of the presentation. Other functions are possible, including for example filtering the view of the level-of-interest metric according to attendee. Thus, the user can see the bookmarks for a particular attendee, or a subset of the attendees, or the entire set of attendees. Such techniques may be useful, for example, if it is determined or suspected that a particular subset of attendees would be interested in a particular part of the presentation that would not necessarily be bookmarked as interesting by the overall group of attendees as a whole. The level-of-interest metric can also be filtered according to type of bookmark, so as to display, for example, an LOI curve representing points where attendees entered bookmarks representing questions, but ignoring points where attendees entered other types of bookmarks.

In one embodiment, the user can navigate several different multimedia streams using either the LOI graph or directly based on the bookmarks and/or notes.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1:
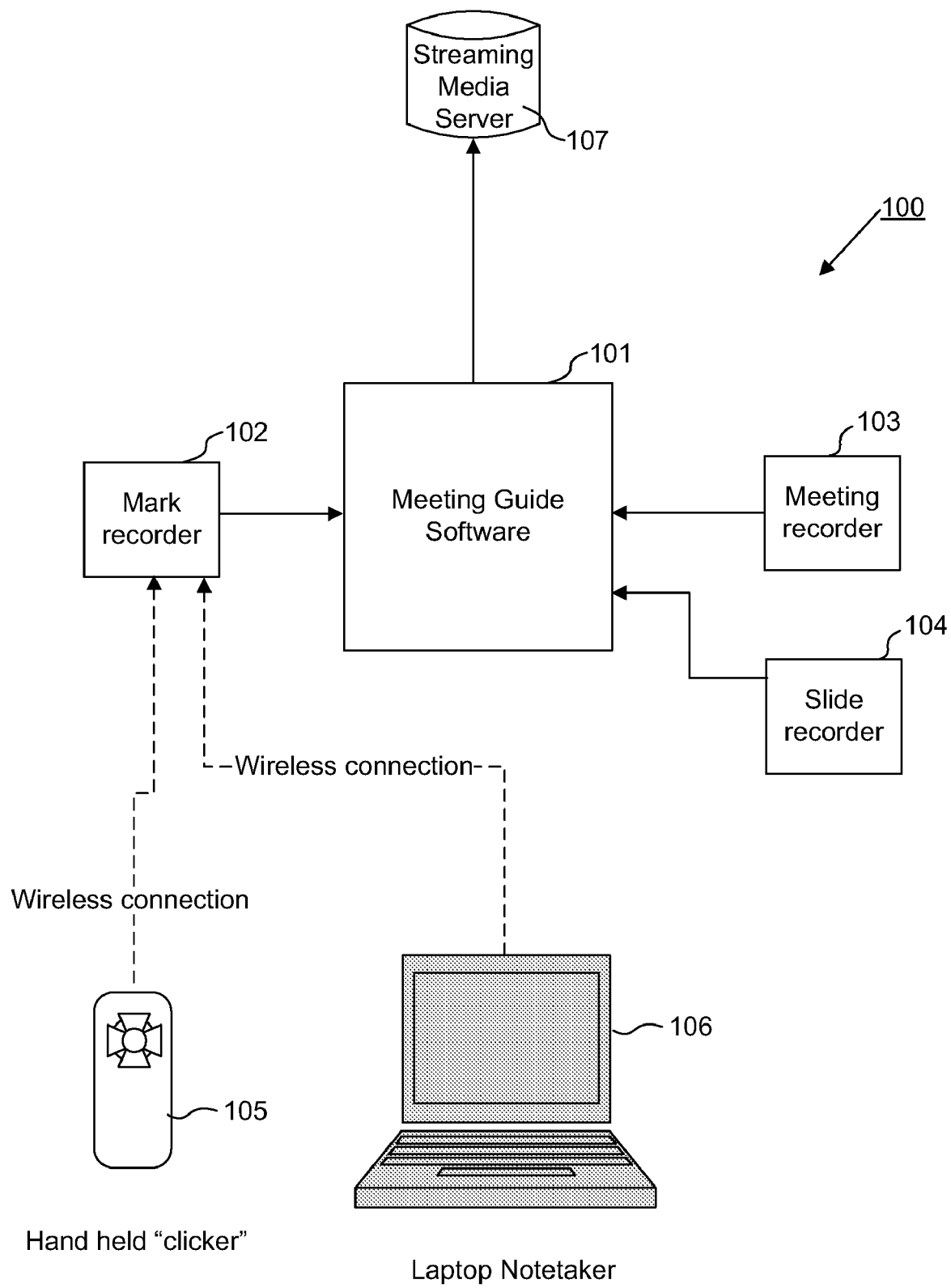
FIG. 1 is a block diagram depicting an architecture for recording and collating bookmarks, according to one embodiment of the present invention.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

For purposes of clarity in the following description, the invention will be described in terms of generating and displaying level-of-interest values for a presentation. However, the invention can be applied to any type of video and/or audio content or media items, including without limitation meetings, movies, television shows, sporting events, home video, or the like. The use of the term "presentation" herein is merely illustrative, and is not intended to limit the applicability of the invention to any particular type of content.

System Architecture and Components

Referring now to FIG. 1, there is shown a block diagram depicting a system 100 for recording and collating user-entered bookmarks, according to one embodiment of the present invention. One skilled in the art will recognize that the various components depicted in FIG. 1 can be implemented, for example, in software on a conventional personal computer.

Meeting recorder 103 and slide recorder 104 are examples of components that record the presentation. In one embodiment, meeting recorder 103 records video and/or audio according to well-known recording technology. Slide recorder 104 records slides as they are displayed to attendees during the course of the presentation, according to well known recording technology. Slide recorder 104 can also record the timing of displayed slides, so that they can later be played back in concert with playback of video and/or audio. Other devices and/or components can also be provided, for recording various aspects of the presentation. For example, a recording of a medical procedure might include recordings of patient metabolic readings; a recording of a demonstration might include telemetry data measured from the device being demonstrated.

Meeting guide software 101 receives recorded information from recorders 103 and 104, and from other presentation recorders, and stores the information in server 107, which in one embodiment is a conventional server for storing media and for providing such media in a streaming format. Server 107 is referred to herein as a streaming media server.

Attendees of the presentation indicate, or bookmark, sections of the presentation that are of interest. FIG. 1 depicts handheld remote device 105 and laptop computer 106, either or both of which can be used for bookmarking the presentation. One skilled in the art will recognize that in some embodiments, only one of devices 105 and 106 is provided, and that in other embodiments, other types of devices can be used in lieu of or in addition to devices 105 and 106 for allowing attendees to provide input regarding sections that are of interest. For example, attendees can provide input via a barcode scanner (not shown), by scanning preprinted barcode labels to indicate a bookmark type.

Alternatively, attendees can provide input via a modified text editor that timestamps the attendee's keystrokes and uses the recorded keystroke data to derive bookmarks. For example, a bookmark would be entered at the time the attendee starts typing; the bookmark and annotation is transmitted (or saved) when the attendee hits an Enter key or moves to the next line.

In one embodiment, several input devices are provided, for example to allow a number of attendees to provide input, each attendee having his or her own device with which to do so. In one embodiment, such input can also be provided by individuals watching the presentation from a remote location, for example via teleconferencing or web-conferencing technology. In another embodiment, such input can be provided by an individual watching a recording of the presentation, after the presentation has taken place; the input provided by such an individual can be combined and collated with "live" bookmarking input in the same manner as described below for collating input from multiple attendees of the live presentation.

Devices 105, 106 transmit attendee input, or bookmarks, to mark recorder 102. In one embodiment such transmission takes place over a conventional communications medium, either wired or wireless. Alternatively, attendee input is transmitted to mark recorder 102 over the Internet, either via secured or unsecured transmission mechanisms. Mark recorder 102 records attendee input provided by devices 105, 106, and time-stamps the input. Meeting guide software 101 collates input from multiple attendees, so as to generate an overall LOI value for various points in the presentation. The methodology by which the LOI values are generated is described in more detail below. In one embodiment, the LOI values for the presentation are stored along with the other presentation data in server 107.

Data from devices 105, 106 can be transmitted to mark recorder 102 in real-time, or it can be transmitted at the conclusion of the presentation or at some later time or date. Thus, in one embodiment devices 105, 106 store a local, time-stamped copy of the attendee input that is later transmitted to mark recorder 102. Devices 105, 106 transmit, to mark recorder 102, time stamps along with the bookmarks and annotations, so that mark recorder 102 and/or meeting guide software 101 can perform collating operations.

Figure 3:
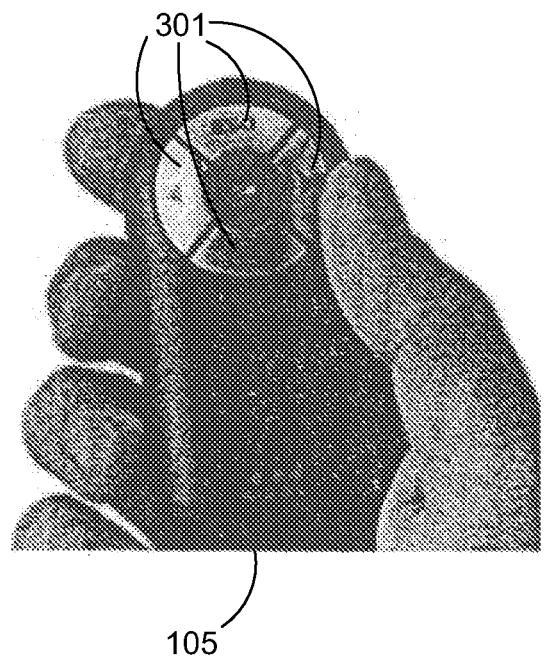
FIG. 3 depicts a handheld wireless remote control device for entering attendee input related to a presentation, according to one embodiment.

Referring also to FIG. 3, there is shown an example of a handheld wireless remote control device 105 for entering attendee input related to a presentation. Device 105 is shown with four buttons 301, for indicating various types of input and/or for performing other functions. One skilled in the art will recognize that device 105 can have any number of buttons 301, and can take any shape or form, without being limited to the particular design depicted in FIG. 3.

Figure 4:
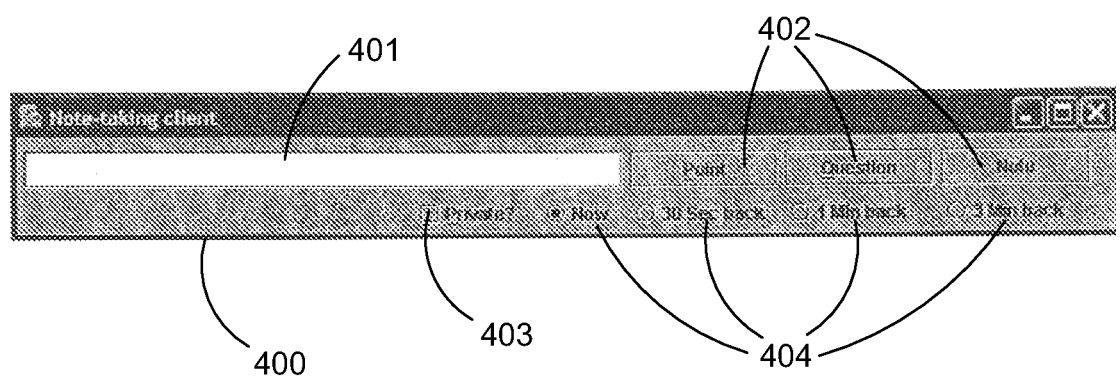
FIG. 4 depicts a dialog box for entering annotations related to a presentation, according to one embodiment.

Referring also to FIG. 4, there is shown an example of a dialog box 400 for entering annotations related to a presentation, according to one embodiment. In one embodiment, software running on laptop 106 presents dialog box 400 to allow attendees to take notes and to indicate bookmarks, or points of interest, during the presentation. Bookmarking software on laptop 106 (or PDA), implemented for example in Java, can be used to generate dialog box 400 and accept input provided therein.

As described above, in one embodiment attendee input is transmitted to mark recorder 102 via the Internet. Accordingly, in such an embodiment, the first time the attendee starts the client software on laptop 106, the attendee provides identifying information such as a name and/or email address; laptop 106 transmits this information to mark recorder 102. Alternatively, laptop 106 can use the attendee's IP address, and/or information stored in a cookie, to identify the attendee. In one embodiment, the attendee can decline to provide identifying information, in which case the bookmark and annotation information provided by that attendee with be marked "anonymous."

The attendee enters a text annotation in field 401, using for example a keyboard (not shown) or stylus input device (not shown). The attendee clicks on one of buttons 402 to enter and record the annotation; in the particular design shown, three buttons 402 are shown, to allow attendee to indicate whether the entered text represents a point, a question, or a note. The attendee can also click on one of buttons 402, leaving field 401 blank, to indicate a point of interest (bookmark) without recording an annotation. The attendee can optionally indicate, by clicking on one of radio buttons 404, that the annotation or bookmark refers to a point in the presentation that occurred in the past, for example thirty seconds ago, or one or three minutes ago; thus, the attendee can retroactively bookmark a point in the presentation. The attendee can also request, by clicking on checkbox 403, that the annotation be kept private, so that the text of the annotation is shown to the attendee only in his/her own private meeting notes, while the bookmark associated with the annotation is combined and collated with input from other attendees and is more widely available as part of the public meeting notes.

One skilled in the art will recognize that the particular design of dialog box 400 is merely exemplary, and that other designs are possible without departing from the essential characteristics of the invention. Furthermore, other designs may omit some of the particular features and elements shown in FIG. 4, and/or may include other features and elements not shown in FIG. 4. For example, dialog box 400 can also provide the attendee with the opportunity to erase a previously entered bookmark. In another embodiment, dialog box 400 can provide the attendee with the opportunity to specify a type of bookmark (for example to indicate that the current point of interest is related to one of a number of topics, or that the current point of interest is the beginning of a question-and-answer session, or the like); in this manner, bookmarks can provide additional information about the content of the presentation.

When an attendee clicks on a button 301 on device 105, or enters a note on laptop 106 using dialog box 400, the input is transmitted to mark recorder 102. The specific time of the input is noted. If additional information was provided, such as a text note or a bookmark type, that information is transmitted to mark recorder 102 as well. Mark recorder 102 transmits the recorded information to meeting guide software 101, which combines and collates the information with information provided by other attendees, and stores the collated information in server 107, as will be described in more detail below.

Mark recorder 102 receives attendee input, including bookmarks, annotations, and the like, from devices 105, 106. Mark recorder 102 passes the received input to meeting guide software 101. In one embodiment, mark recorder 102 or meeting guide software 101 also receives parameters for the presentation, such as a meeting identifier, uniform resource locator (URL) of the video stream, or the like, so that attendee input can be appropriately matched with the proper identifier.

In one embodiment, meeting guide software 101 collates input from multiple attendees and stores the input at server 107. In one embodiment, bookmarks and annotations are time-stamped relative to the time of the beginning of the presentation, so as to synchronize with the audio and/or video recording of the presentation. In one embodiment, meeting guide software 101 also accepts information from meeting recorder 103 and/or slide recorder 104, and stores this content in server 107. In one embodiment, meeting guide software 101 also performs additional functions, such as associating a meeting identifier with the received bookmarks and annotations, noting and storing the length of the meeting, and storing the names, email addresses, and/or other contact information for attendees, presenters, and other participants. In one embodiment, meeting guide software 101 also transmits an indicator to server 107 when the presentation ends.

In one embodiment, when server 107 receives an indicator that the presentation has ended, it transmits a copy of notes, bookmarks, and/or other information about the presentation to individual attendees and/or presenters. In one embodiment, the determination as to who should receive such information depends upon pre-defined preferences and/or subscription lists. In one embodiment, only attendees who have made annotations along with the bookmarks receive copies of annotations. Annotations marked "private" are sent only to their author and are not shared with other attendees. Annotations and other information can be sent in any desired format. For example, the information might be sent according to standard electronic mail messaging techniques.

In one embodiment, bookmarks and annotations are collected for a single attendee or viewer of the presentation. Aggregation still takes place, but is based on the series of bookmarks and annotations from that single attendee or viewer. For example, a number of closely-spaced bookmarks would indicate a section that is of relatively high level of interest as compared with a section having fewer or farther-spaced bookmarks.

Method of Operation

Figure 8:
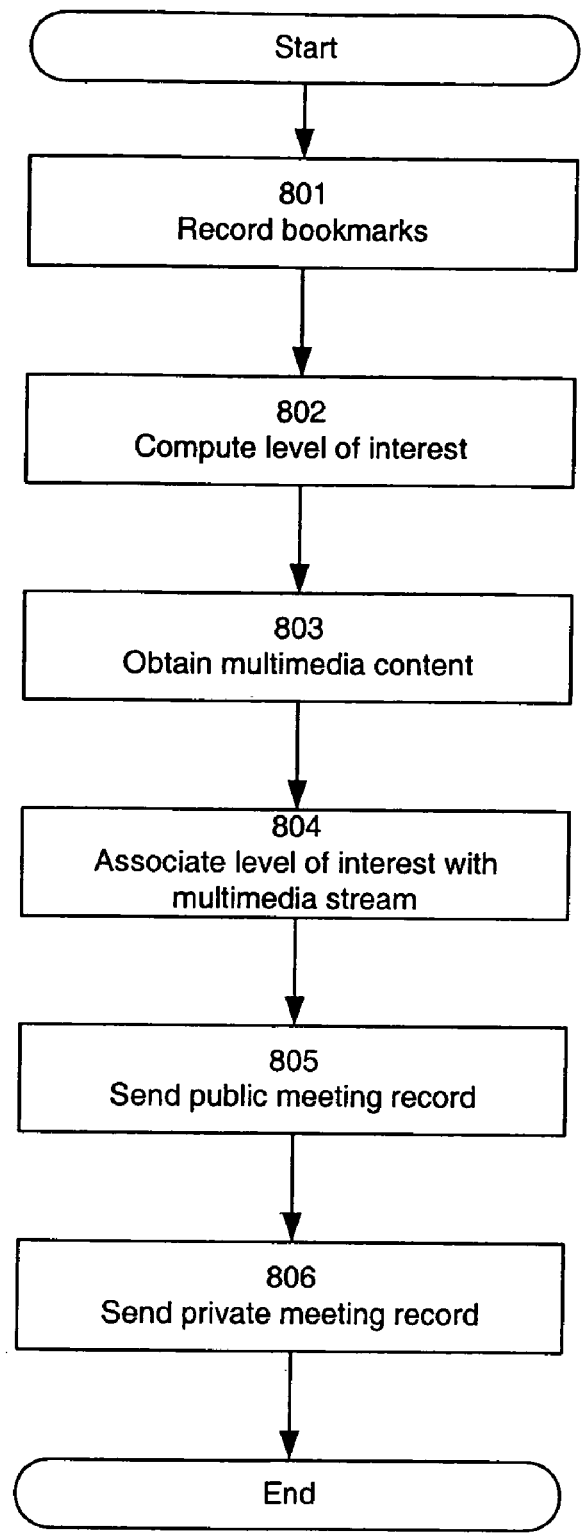
FIG. 8 is a flow chart depicting overall operation of the invention according to one embodiment.

Referring now to FIG. 8, there is shown a method of recording, combining, and collating level-of-interest data according to one embodiment.

Mark recorder 102 records 801 bookmarks received from devices 105, 106. Meeting guide software 101 receives this information from mark recorder 102, and computes 802 a level-of-interest value for various points in the presentation. Software 101 receives 803 multimedia content (including video, audio, and/or slides) from recorders 103, 104, and associates 804 the level-of-interest values with the corresponding points in the received multimedia content.

In one embodiment, once a presentation is over, meeting guide software 101 transmits 805, to attendees and other interested persons, a record of the presentation that includes a recording (or a link to a recording), and level-of-interest data for various points in the presentation. In one embodiment, meeting guide software 101 also transmits 806 a private record of the presentation to each attendee that entered annotations designated as "private"; this private record contains the attendee's own annotations, but omits private annotations entered by other attendees.

In some embodiments, LOI values are generated at the time of the presentation, or soon thereafter; in other embodiments, LOI values are generated on-demand, at the time a user requests them.

Figure 9:
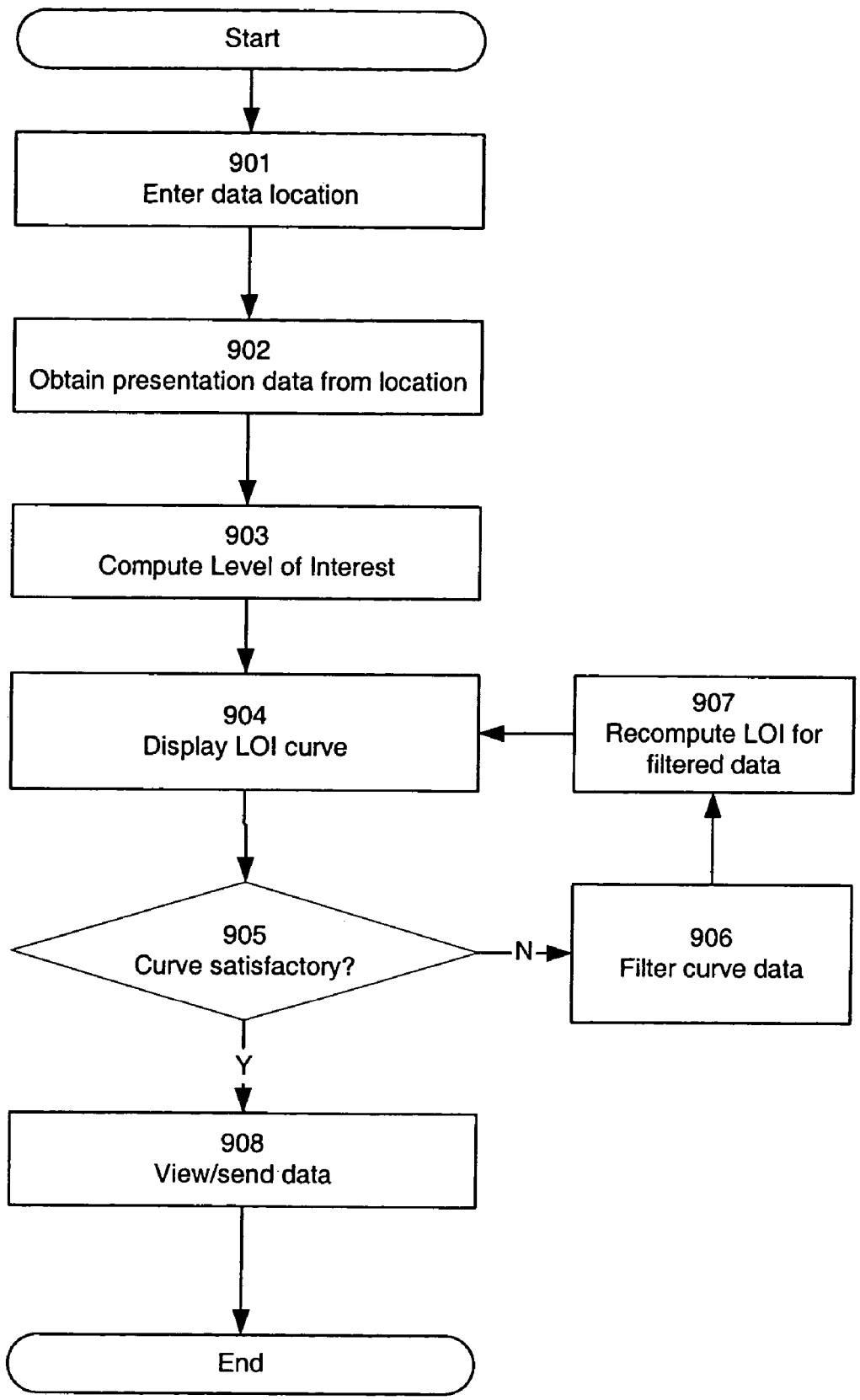
FIG. 9 is a flow chart depicting a method of determining and displaying a level of interest for a recording, according to one embodiment.

Referring now to FIG. 9, there is shown a method of determining and displaying level-of-interest data for a recording, according to one embodiment. The steps may be performed by software 101, or by a software module such as an LOI calculator within software 101 or in a separate functional component. A data location is provided 901, including for example meeting ID, URL of the recorded presentation and/or URL of the video; these items are then used to generate an integrated presentation for output. Software 101 obtains 902 the recording from the specified location, including video and/or audio, as well as attendee bookmarks. In an alternative embodiment, the recording is transmitted directly to software 101 in real time, upon completion of a presentation, and/or on demand. In one embodiment, the recording itself need not be retrieved, as software 101 can compute, display, and store LOI values without accessing the recording itself. For example, a library of presentations may be kept, and LOI information may be associated with, but not stored with, corresponding presentations.

Software 101 then computes 903 the LOI for various points in the presentation, according to techniques described in more detail below, and displays 904 an LOI curve or other representation of LOI values.

In one embodiment, the computation and display of LOI are iterative, so that the user has an opportunity to change parameters and/or refine the displayed output. For example, the user may choose to filter the data, so that only the bookmarks from certain users will be included in the overall calculation. Alternatively, the user can specify or alter other parameters, such as the length of the sliding window, as described in more detail below. In one embodiment, the user is given an opportunity to indicate 905 whether the output LOI curve is satisfactory; if he or she indicates that it is not satisfactory (for example by providing alternative parameters), the curve data is filtered 906 accordingly, the LOI is recomputed 907 for the filtered data, and steps 904 and 905 are repeated. A user might decide to filter results using only the shape of the LOI curve, if desired. If the curve has too many peaks, or is uniformly high so as to be of limited use, a user might decide to filter the bookmarks to gain a more varied LOI curve; the user might make the decision to do so without even watching the contents of the presentation.

If, in step 905, the user indicates that the displayed curve is satisfactory, the LOI data is viewed and/or transmitted 908. Fine-tuning may also include dropping data points, for example to disregard one attendee's bookmarks as lacking credibility. In one embodiment, once the user has indicated that he or she is satisfied with the fine-tuning, the settings and configuration are stored so that subsequent viewers can view the processed data without refiltering.

LOI can be determined for any number of points during the presentation, depending on the degree of granularity desired for the resultant LOI graph. In one embodiment, LOI is determined for points at fixed intervals; in another embodiment, LOI is determined for points at which one or more attendees provided some type of input; in yet another embodiment, LOI is determined for points at which a threshold number of attendee inputs is detected within a surrounding time period.

The LOI for each point in the presentation is calculated, for example, using a sliding window function to find the number of annotations and/or bookmarks that were made within 2.5 minutes of that point (60 seconds after the point and 90 seconds before it). Of course, one skilled in the art will recognize that any window length can be used, and that the particular window length described herein is merely exemplary. In one embodiment, software 101 determines a relative influence of each bookmark on the level of interest at a particular point, based in part on the length of time between the bookmark data and the point. For example, the influence of the bookmark may be inversely proportional to the time between the bookmark and the point; alternatively, some other correspondence can be used. In general, the greater the number of bookmarks, and/or the closer they are to the point being calculated, the higher the calculated level of interest at that point. In order to reduce fluctuations in the resulting graph, in one embodiment a smoothing function is provided, wherein the standard deviation of the LOI from the zero point is calculated and used as a threshold value; only those points with an LOI greater than the threshold value are counted. In one embodiment, a user of the system can change the window size, and can enable or disable the smoothing function as desired.

In other embodiments, other algorithms can be used to compute the LOI function. Alternatively, the system can simply mark the points of interest on a graph, so users can visually distinguish the important sections.

Figure 11:
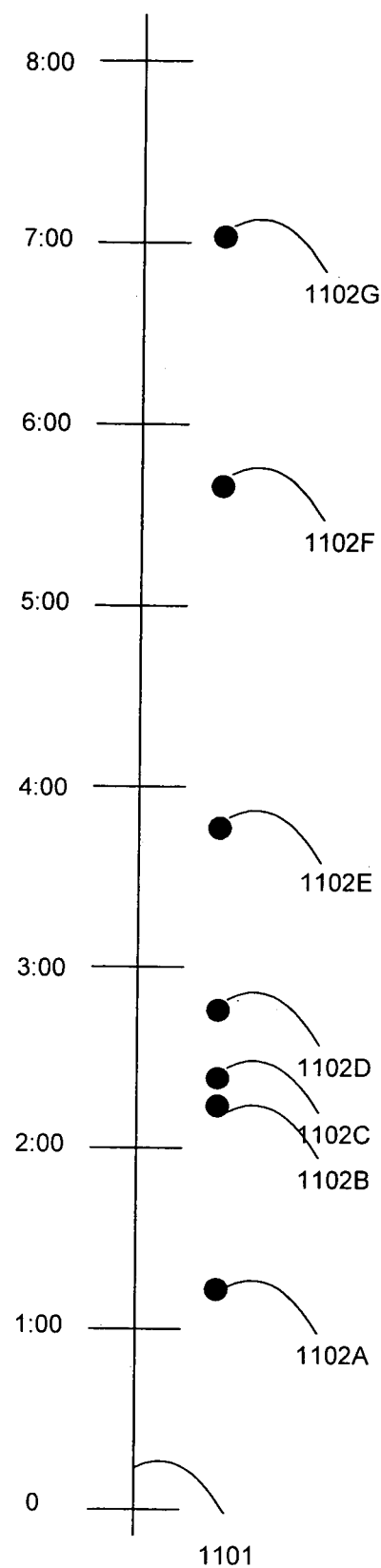
FIG. 11 depicts an example of a series of attendee input, or bookmarks, indicating level of interest.
Figure 12:
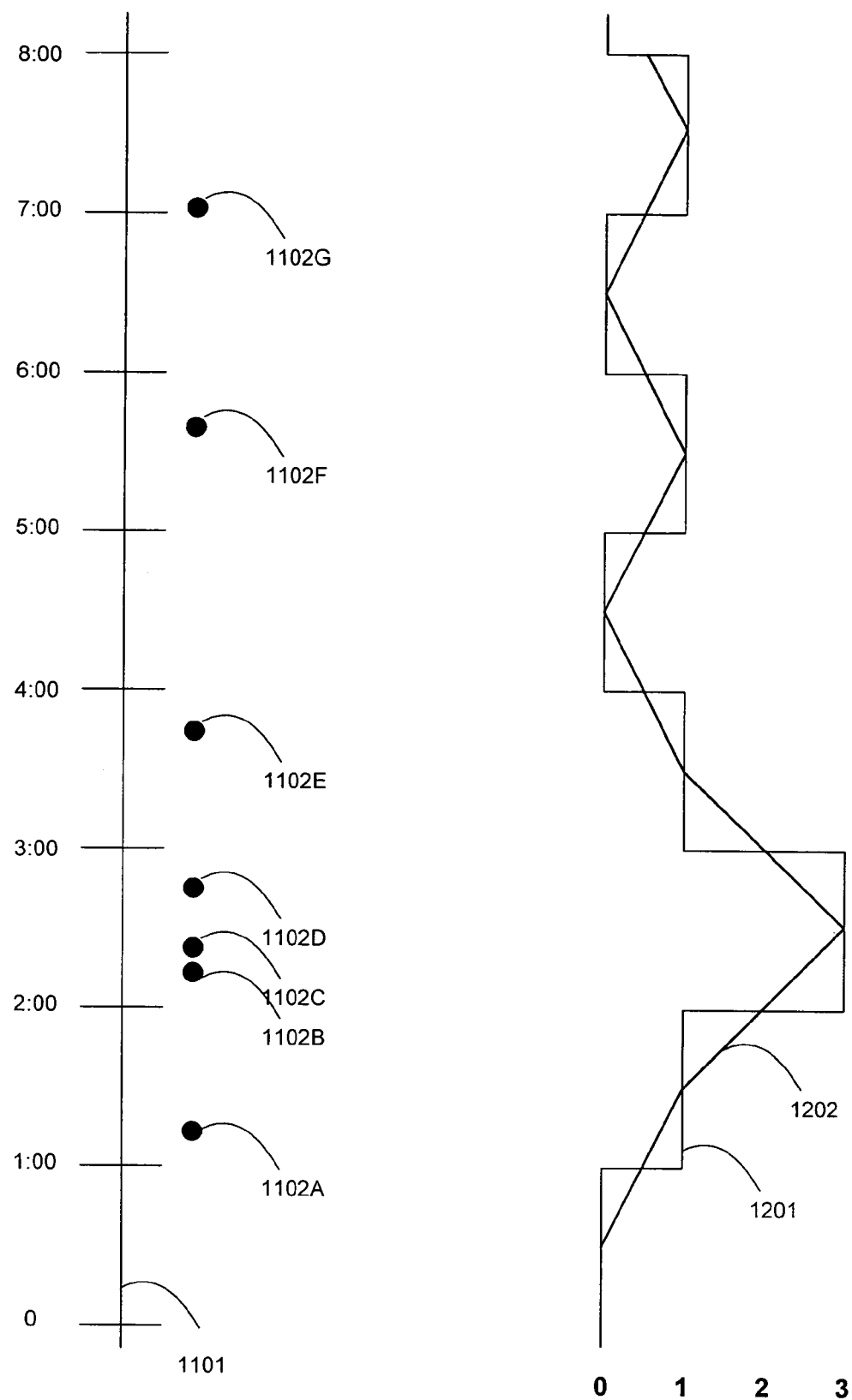
FIG. 12 depicts an example of an LOI graph using fixed windows.
Figure 13:
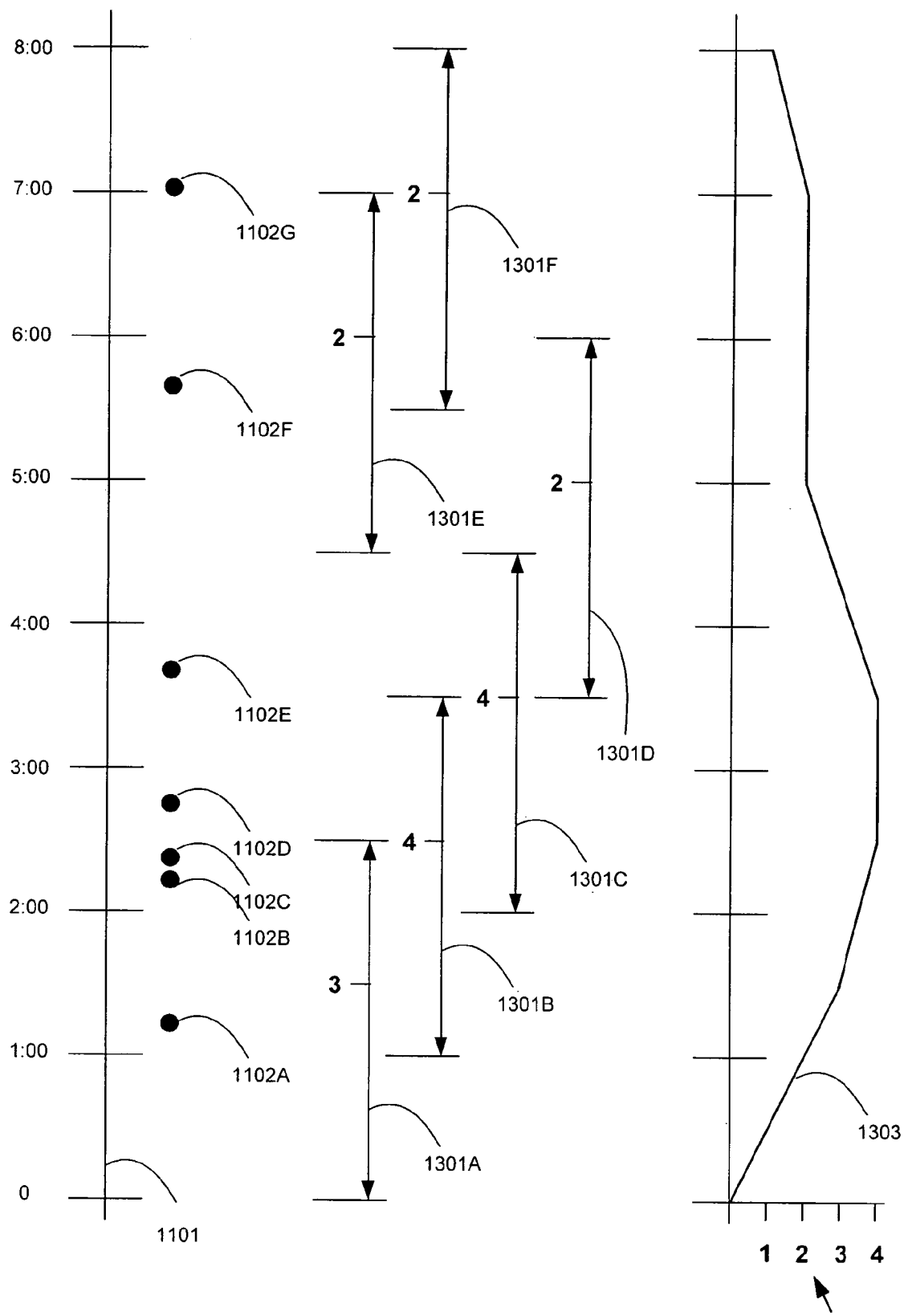
FIG. 13 depicts an example of an LOI graph using sliding windows.

Referring now to FIGS. 11 through 13, there is shown an example of a series of attendee inputs (bookmarks), and a number of different LOI graphs that can be drawn from the attendee input, according to the present invention. FIG. 11 depicts a series of bookmarks, represented by dots 1102A through 1102G along time axis 1101. Time axis 1101 is depicted in terms of one-minute increments, for illustrative purposes. Each dot 1102 represents a single bookmark by an attendee, indicating a point of interest at the indicated time.

FIG. 12 depicts an LOI graph that can be drawn from the attendee input of FIG. 11. Here, the input is considered in fixed (non-sliding) one-minute increments. The number of the bookmarks within each fixed one-minute interval is determined; the resulting values are plotted in curve 1201. Thus, for those one-minute intervals where one bookmark took place, a value of 1 is shown; for those intervals where three bookmarks took place, a value of 3 is shown. Curve 1201 can also be interpolated or smoothed to remove discontinuities, resulting in curve 1202.

FIG. 13 depicts an LOI graph employing a sliding window. For illustrative purposes, the LOI value is shown at one-minute intervals; however, it will be recognized that the LOI value can be determined at any desired level of granularity, or it can be determined on a time-continuous basis. For illustrative purposes, the window is shown at various window positions 1301A through 1301F, each extending one minute (sixty seconds) into the future and one and a half minutes (ninety seconds) into the past. For each point, the LOI value is to be determined by counting the total number of bookmarks within the window that surrounds that point. For example, for window position 1301A, three bookmarks 1102A, 1102B, 1103C fall within the window. Thus, the LOI value at the 1:30 point (corresponding to window position 1301A) is 3. Similarly, for window position 1301D, two bookmarks 1102E, 1102F fall within the window. Thus, the LOI value at the 5:00 point (corresponding to window position 1301D) is 2.

LOI curve 1303 is derived by smoothing or interpolating among determined LOI values. In addition, as described below, LOI curve 1303 can be further adjusted by counting only those pixels having a weight that exceeds a standard deviation of pixel weights.

Figure 14:
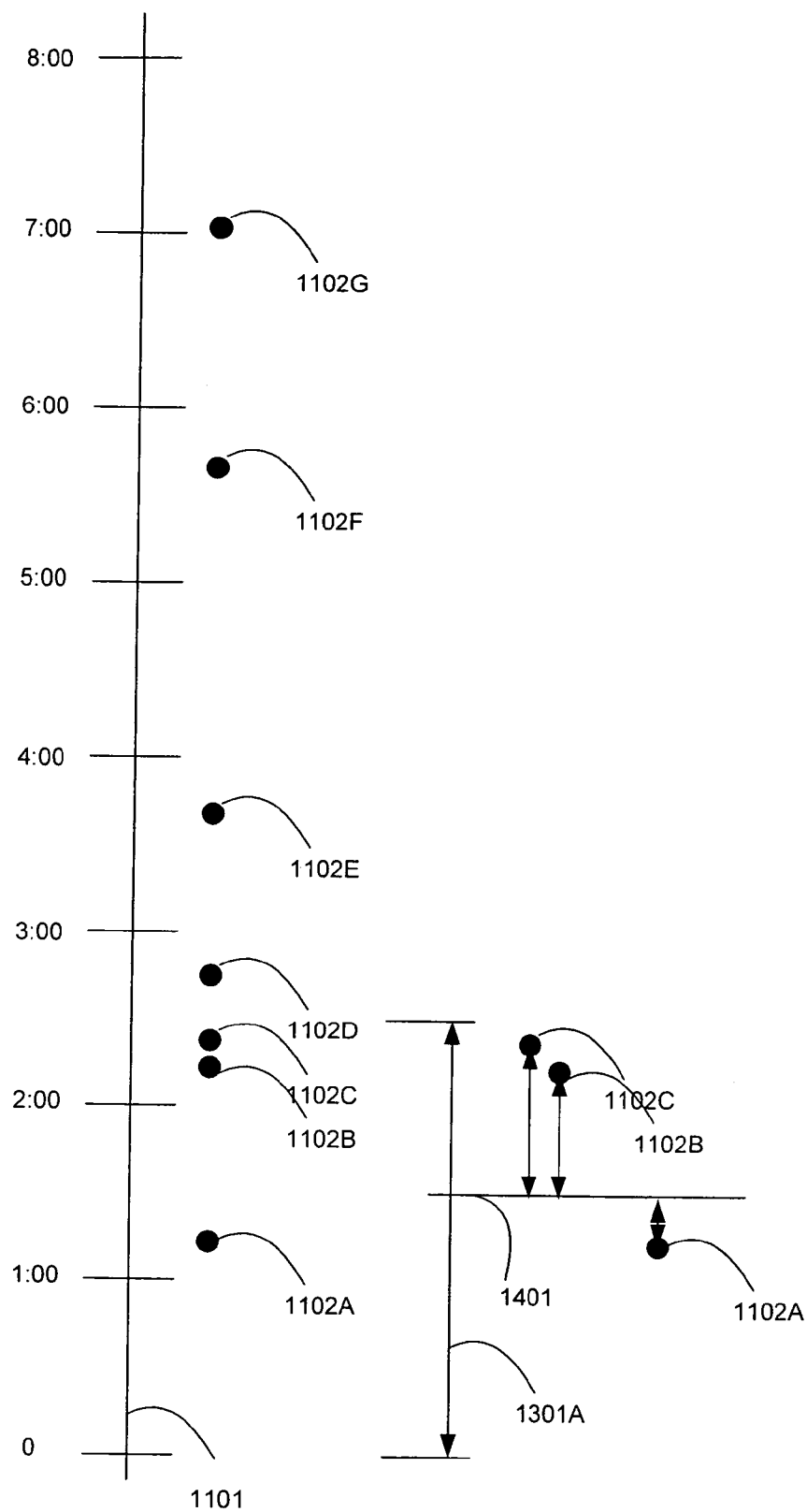
FIG. 14 depicts an example of adjusting the effect of each bookmark according to the time difference between the bookmark and the LOI point being calculated.

Referring now to FIG. 14, there is shown an example of adjusting the effect of each bookmark according to the time difference between the bookmark and the LOI point being calculated. For illustrative purposes, only one window position 1301A is shown, although the described techniques can be applied to determine LOI values at a number of window positions. For each bookmark 1102A, 1102B, 1102C that appears within window 1301A, the time difference between point 1401 and the time of the bookmark 1102 is determined. Bookmarks 1102 that are farther away from point 1401 carry less influence than bookmarks 1102 that are closer to point 1401. Thus, in the example shown, bookmark 1102A has a relatively high degree of influence, or weight, than do bookmarks 1102B, 1102C. The LOI value for point 1401 is calculated by determining an adjusted value for each bookmark 1102 within window 1301A, the adjusted value being determined according to weight. Then, the adjusted values are summed to derive an LOI value for point 1401. As described above, LOI values between determined points can be interpolated or smoothed, if desired.

Figure 10:
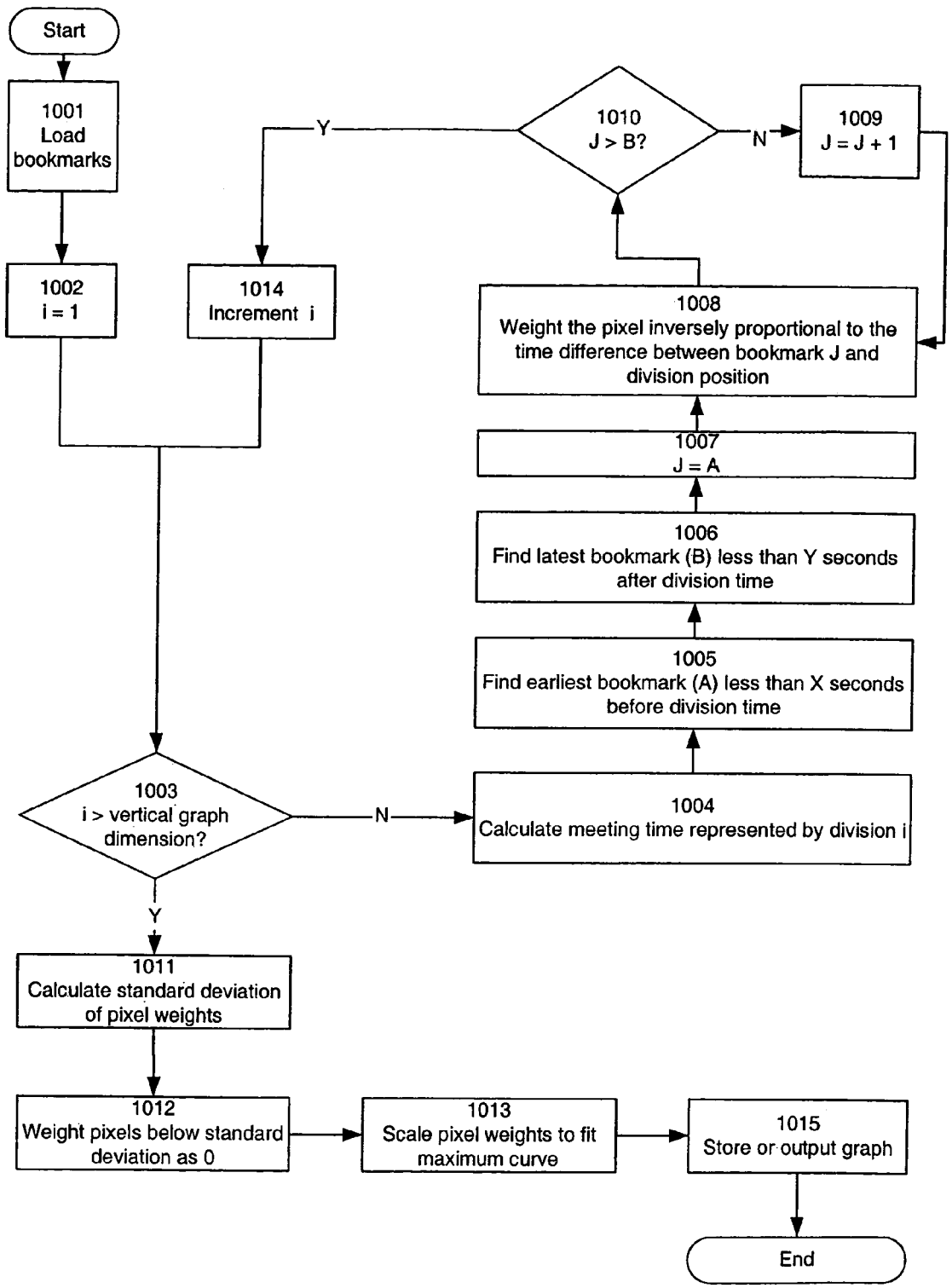
FIG. 10 is a flow chart depicting a method of generating an LOI graph according to one embodiment.

Referring now to FIG. 10, there is shown a method of generating an LOI graph according to one embodiment. In one embodiment, the steps of FIG. 10 are performed by meeting guide software 101, although one skilled in the art will recognize that the steps can be performed by other components.

Bookmarks are retrieved 1001. A variable, i, is initialized 1002 to the value of 1.

The value of i is compared 1003 with the vertical dimensions of the graph to be drawn, to determine whether the end of the graph has been reached. These vertical dimensions represent the time span to be depicted by the graph, and may depend, for example, on screen size, window size, user preference, or the like. Vertical dimensions may be measured, for example, in pixels on a display screen. The depicted method assumes that the vertical dimension of the graph corresponds to the time axis; however, in other embodiments the graph may be drawn with the horizontal dimension corresponding to time, in which case the comparison in 1003 (and other steps of the method) would refer to the horizontal dimension rather than the vertical.

If i is not greater than the vertical dimensions of the graph, the end of the graph has not yet been reached, and steps 1004 through 1010 and 1014 are performed. Software 101 calculates 1004 the meeting time represented by division i. Given values for X and Y (representing the length of the sliding window), software 101 then locates 1005 the earliest bookmark less than X seconds before the meeting time represented by division i, and locates 1006 the latest bookmark less than Y seconds after the meeting time represented by division i. The first of these located bookmarks is designated as A, and the second is designated as B.

A variable J, is initialized 1007 to the point of the presentation represented by A. The relative contribution to LOI by each bookmark is determined inversely proportional to the time difference between the bookmark time and the meeting time represented by division i. Thus, in step 1008, if a bookmark appears at the point represented by J, the LOI value (represented by a pixel drawn on the graph) is increased in a manner that is inversely proportional to the time difference between J and the meeting time represented by division i. If, in 1010, J is not greater than B, the end of the window has not yet been reached; thus, J is incremented 1009 and step 1008 is repeated.

If, in 1010, J is greater than B, the end of the window has been reached; i is incremented 1014, and step 1003 is repeated to determine if the end of the graph has been reached. As described above, if in 1003 the end of the graph has not been reached, steps 1004 through 1010 and 1014 are repeated.

If, in 1003, i is greater than the vertical graph dimensions, the graph is ready to be displayed. In one embodiment, steps 1011 through 1013 are performed to smooth the graph. Software 101 calculates 1011 the standard deviation of all pixel weights, and weights 1012 all pixels below that standard deviation (or below some other threshold value) as zero. Software 101 then scales 1013 the pixel weights to fit the maximum curve. The graph is then stored or output 1015.

In one embodiment, once the LOI graph has been constructed, a presentation record, along with LOI data, is constructed in the form of an integrated multimedia message, such as a web page or interactive movie, or using a tool designed to display related collections of information. In one embodiment, the message includes a Synchronized Multimedia Integration Language (SMIL) file for playing audio, video, slides, notes text, and/or a representation of the LOI graph with the times of users bookmarks and slide transitions marked. Alternatively, the message may include a representation in the form of a link to a web page containing a video and/or audio stream, and/or text notes made by users. In one embodiment, each of the text notes is presented as a hyperlink that cues a player to play the recorded presentation video corresponding to the time that the note was made.

Figure 5:
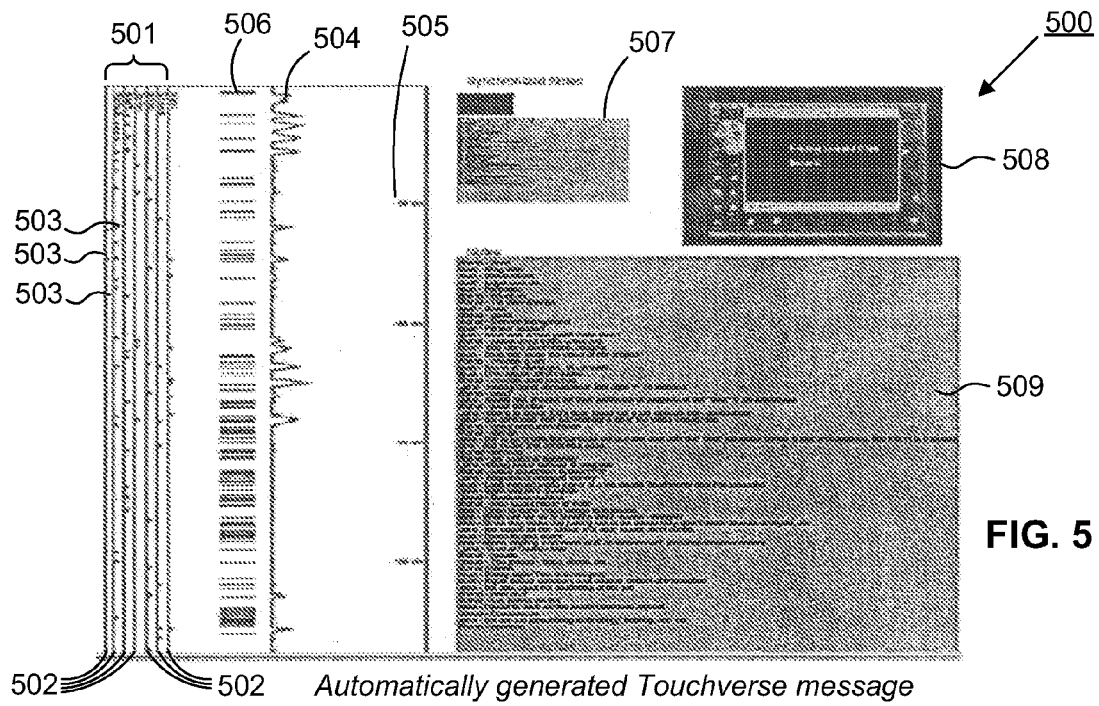
FIG. 5 is a screen shot depicting a display including an LOI graph, notes, and slides of a recording, according to one embodiment.

Referring now to FIG. 5, there is shown an example of a display 500 including an LOI graph, notes, and video playback of a recording, according to one embodiment. In one embodiment, display 500 is transmitted as a message to attendees and/or other interested individuals. One skilled in the art will recognize that the particular arrangement and selection of data and displayed elements shown in FIG. 5 is merely exemplary, and that other arrangements are possible without departing from the essential characteristics of the invention. Raw LOI data 501 is displayed in graphical form, including bookmarks 503 for a number of attendees. A separate vertical axis 502 is shown for each attendee, with bookmarks 503 for that attendee shown adjacent to the axis 502. Slide transitions 506 are shown in graphical form, with each transition 506 aligned vertically with a corresponding point on axes 502. Time designations 505 are also indicated and are similarly aligned.

Display 500 also includes LOI graph 504, derived and generated according to techniques described above. In one embodiment, the user can click on sections of LOI graph 504 to expand, scroll, alter, highlight, or otherwise manipulate the display.

Display 500 also includes slide display 508, for displaying slides from the presentation. Notes area 509 displays a set of notes for the presentation. Display area 507 depicts a web page snapshot of notes area 509.

In one embodiment, LOI graph 504 is also manually scrollable. In one embodiment, notes area 509 scrolls automatically, and/or is manually scrollable, so that the relevant notes are displayed on the screen. The user can control playback of the video recording by manipulating, pointing to, or dragging along LOI graph 504. Other areas of the screen, including notes area 509, can also be used for navigation in the video recording.

Figure 6:
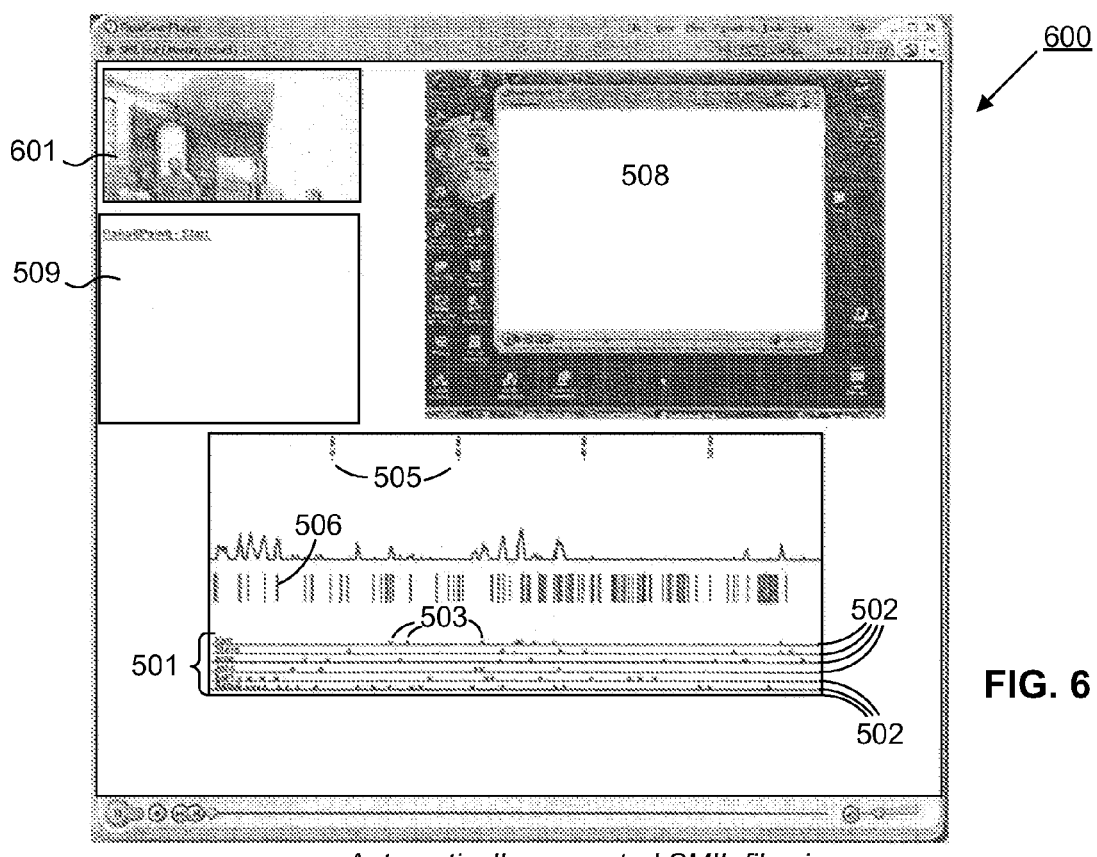
FIG. 6 is a screen shot depicting a display including an LOI graph, slides, and video playback of a recording, according to one embodiment.

Referring now to FIG. 6, there is shown an example of a display 600 including an LOI graph and video playback of a recording, according to one embodiment. In one embodiment, display 600 is viewable through a multimedia or video player such as the RealOne player available from RealNetworks, Inc. of Seattle, Wash. One skilled in the art will recognize that the particular arrangement and selection of data and displayed elements shown in FIG. 6 are merely exemplary, and that other arrangements are possible without departing from the essential characteristics of the invention.

Display 600 has many of the same components as display 500. Video player 601 shows recorded video from the presentation. Notes area 509 displays attendee notes. In one embodiment, notes shown in 509 are synchronized to the section of the presentation currently being displayed in player 601. In another embodiment, notes shown in 509 include hyperlinks that can be used to navigate to a web page including an embedded video player 601. In one embodiment, LOI graph 504 (along with associated axes 502 and displays 505 and 506) scrolls automatically as player 601 plays the video recording, so that the video currently being played corresponds to a displayed section of graph 504. In display 600, the display of raw LOI data 501, as well as LOI graph 504, slide changes 506, and time designations 505, are shown in a horizontal orientation. One skilled in the art will recognize that all of these features can be shown in either vertical or horizontal orientation, and that the choice of orientation can be a user-defined preference.

Figure 2:
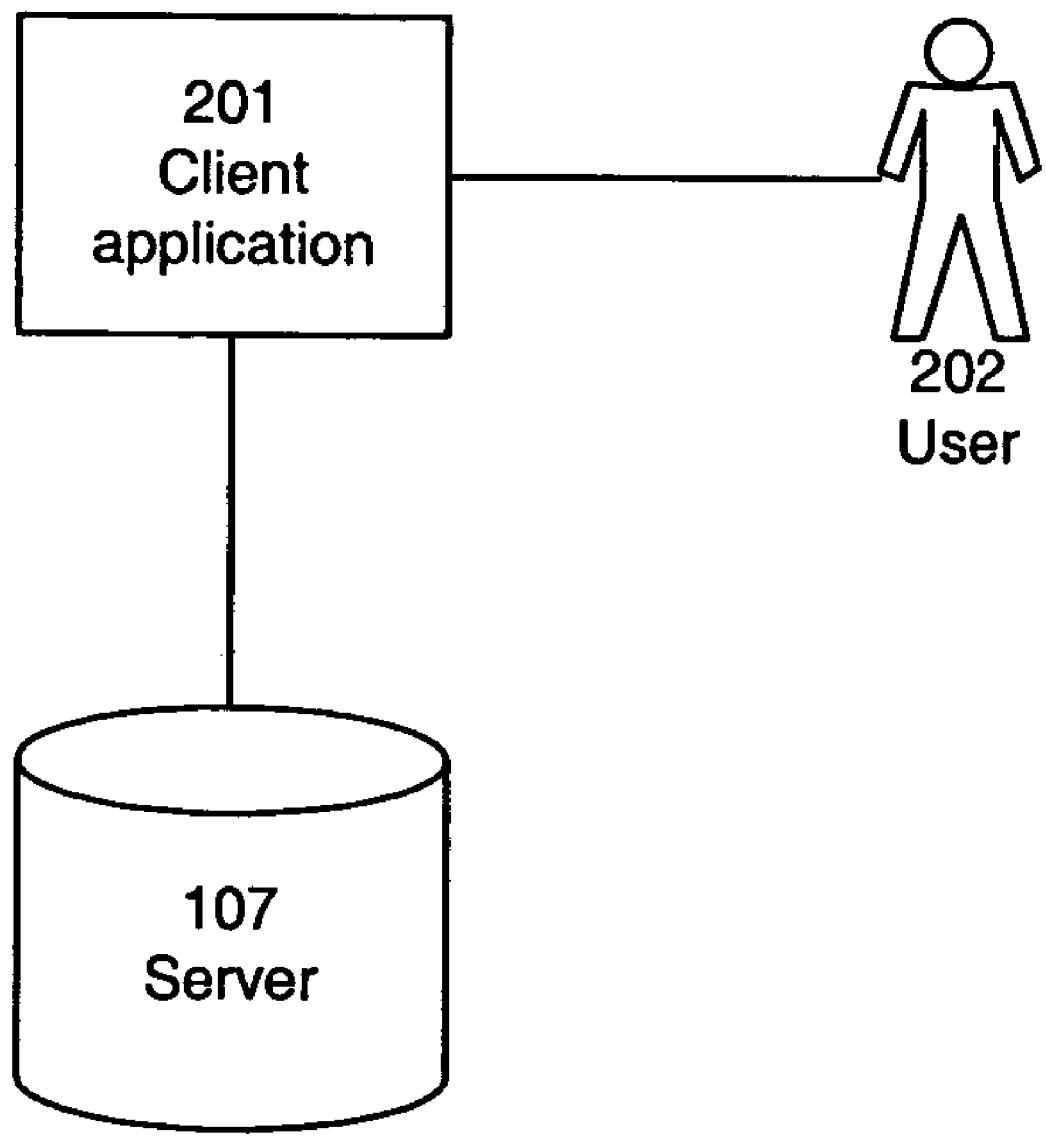
FIG. 2 is a block diagram depicting an architecture for viewing an LOI graph and navigating within a recording, according to one embodiment of the present invention.

Referring now to FIG. 2, in one embodiment, a specialized client application 201 can be provided for manipulating and viewing the recording data, including LOI graphs and other information. The client application receives a URL or other identifier of the location of the recording data; the application then retrieves the data from server 202 and displays LOI graphs and other information to user 202, along with various user interface elements for manipulating and configuring the display.

Figure 7:
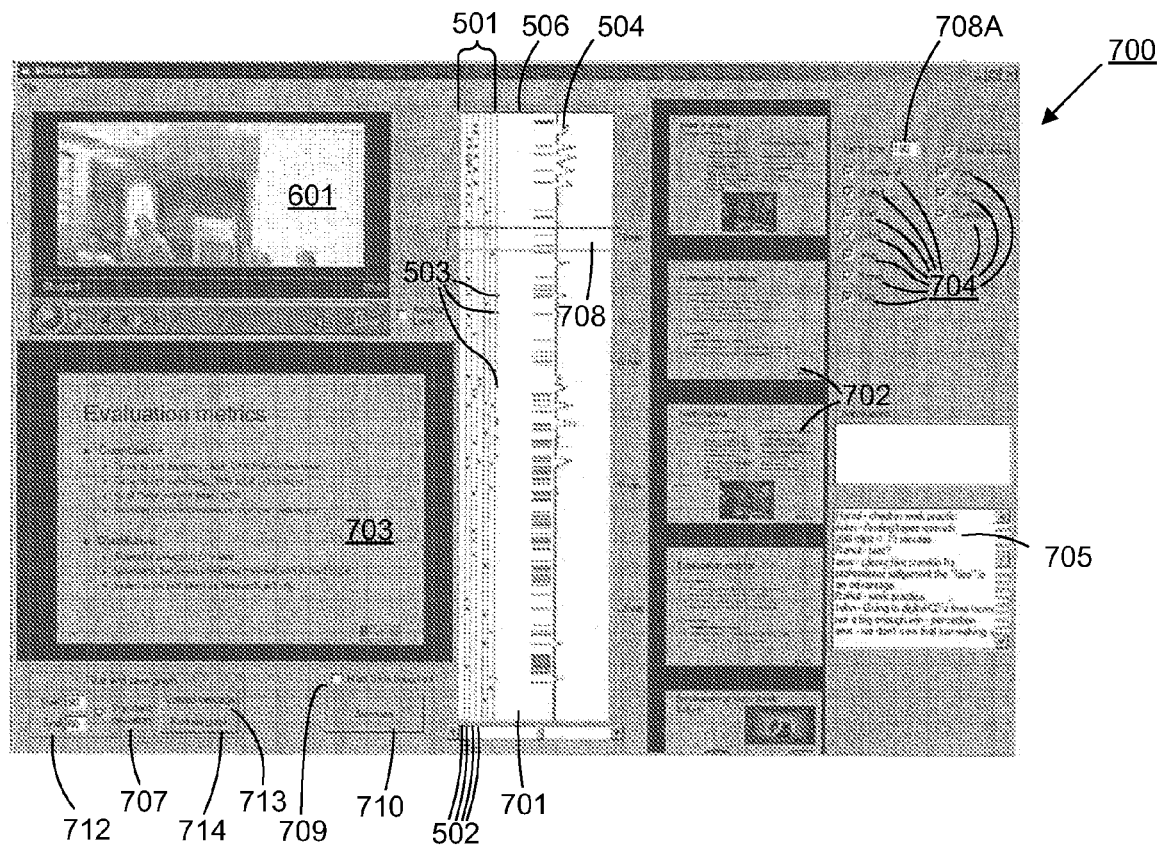
FIG. 7 is a screen shot depicting a display presented by a specialized client application, including an LOI graph and other information associated with a recording, according to one embodiment.

Referring now to FIG. 7, there is shown an example of such a display 700, as it is presented by specialized client application 201 according to one embodiment. One skilled in the art will recognize that the particular arrangement and selection of data and displayed elements shown in FIG. 7 are merely exemplary, and that other arrangements are possible without departing from the essential characteristics of the invention.

Graph display area 701 is a vertical rectangle providing a simple unified overview of the LOI information for the presentation. Graph display area 701 includes raw LOI data 501 displayed in graphical form, including bookmarks 503 for a number of attendees. As described in connection with FIG. 5 above, a separate vertical axis 502 is shown for each attendee, with bookmarks 503 for that attendee shown adjacent to the axis 502. Bookmarks 503 are presented as colored dots at the appropriate times along axis 502. In one embodiment, bookmarks 503 are placed next to the axis 502 for the user that made them, and are color-coded to show different types of notes and bookmarks.

In one embodiment, the user can see additional information about a note or bookmark by hovering over the note or bookmark 503 with a pointing device such as a mouse. This causes details (such as the attendee that created the note or bookmark, the type of bookmark, note text if any, and the like) to be displayed as a ToolTip.

As described above in connection with FIG. 5, slide transitions 506 can be displayed in display area 701 in the form of thin horizontal lines at the point of transition. In one embodiment, slide transitions 506 are shown in different colors depending on the length of time the slide was displayed; for example, blue can be used for slides shown for at least two seconds, while pink can be used for slides shown for less than two seconds. Color-coding allows the user to quickly find movies or rapid slide changes. In one embodiment, lines representing slide transitions 506 can be made longer for those slides that the user has already viewed, thus allowing the user to keep track of which parts of the presentation they have already viewed.

Display area 701 also includes LOI graph 504, derived and generated according to techniques described above. In one embodiment, the user can click on sections of LOI graph 504 to expand, scroll, alter, highlight, or otherwise manipulate the display thereof, and can also directly navigate through the presentation by clicking on any section of graph 504 to move to the corresponding point in the video or audio recording.

The user can configure LOI graph 504 by manipulating various user interface elements. For example, checkboxes 704 allow the user to specify particular attendees; if the user changes the configuration, LOI graph 504 is re-drawn to only include input from those attendees whose checkboxes 704 are activated. Other checkboxes 704 allow the user to specify particular bookmark types such as point, note, or question (corresponding to the annotation buttons 402 shown above in FIG. 4); if the user changes the configuration, LOI graph 504 is redrawn to only include input of the selected type or types. Standard deviation checkbox 707 enables or disables the smoothing function.

Play marker 708 is a horizontal line that marks the current position of playback in player window 601. As playback progresses, play marker 708 moves in a downward direction along the length of display area 701. The user can click on play marker 708 and slide it up and down display area 701. In one embodiment, moving play marker 708 to various locations in display area 701 causes thumbnail representations of corresponding slides 702 to be displayed. Moving play marker 708 also causes corresponding notes to be displayed in area 705.

Play marker 708 by default covers a span of three minutes, so that field 705 displays any notes entered within the three-minute time period surrounding the current position of play marker 708. The user can adjust the span by changing the value entered in field 708A.

Thumbnail representations 702 of slides are also included. In one embodiment, display 700 only includes slides that were shown for more than ten seconds (or some other user-configurable time period). The user can also navigate to a specific point in the video or audio playback by clicking on a thumbnail 702; this takes the user to the point in the presentation corresponding to the thumbnail 702. The user can also scroll through thumbnail representations 702.

Slide view area 703 provides a detailed view of a slide. When a video or audio recording is being played, slide view area 703 displays the slide corresponding to the current point in the recording. When the user is navigating through a presentation by moving play marker 708, slide view area 703 displays the slide corresponding to the current position of play marker 708.

Checkbox 709 allows the user to mark a slide as important; in one embodiment, such a designation causes that slide's transition 506 to be displayed in a larger and more prominent manner in display area 701 (for example using a color that is distinct from the color used for other slide transitions 506).

As described above, any notes corresponding to the current position of slide view area 703 are displayed in notes area 705. The user can also double-click on a note in area 705 to navigate to the corresponding point in the recording.

A user can also add annotations by clicking on annotate button 710. The user can also associate text notes to each individual rectangle, as desired.

Start and end fields 712 set the interval for the sliding window determination of LOI values. The user can enter values to specify the start and end point for the sliding window, relative to a current point being evaluated.

Upload message button 713 causes the filtered and annotated presentation to be sent to other users, as described in step 908 above.

Redraw graph button 714 causes the graph in area 701 to be redrawn; in some embodiments, however, the graph is automatically redrawn when appropriate.

Once the user has finished viewing, editing and/or annotating the presentation data, he or she can save the data, print it, and/or send it to another person. Recipients receive a display similar to that shown in FIG. 5 or FIG. 6. The contains, for example, a SMIL file including notes and annotations, a link to a synchronized notes web page, data files and the like. Recipients can view the SMIL file, or, if they have access to client application 201, view the meeting data in the client application.

Uses and Advantages

The present invention has a number of uses and advantages. Attendees of a presentation can use the techniques of the present invention to quickly locate points of interest in the presentation. Since the attendees already know the general high points of the presentation, they can quite easily use the peaks of LOI curve 1202 to easily locate any specific segment. Individuals who did not attend the presentation can use the techniques of the present invention to skim through the main points of the presentation without having to watch the entire recording. The LOI graph and attendee notes can help such individuals to more efficiently find specific points of interest in the recording.

In other embodiments, the techniques of the present invention can also be used to employ the LOI curve in combination with the slide transitions to automatically generate a set of clips summarizing the important sections of the presentation.

Users can also use the techniques of the present invention to filter according to the generated LOI curve, so as to bring out salient points, annotate specific sections, and send streamlined data to other people.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A computer implemented method for generating a series of level-of-interest values for a media item, comprising:
   receiving, with a computer, input indicating interest in a specific point within the media item from a plurality of users, the input being one from the group of keystrokes, audio input and video input, wherein the media item comprises a presentation or a live event;
   timestamping, with the computer, the input;
   deriving, with the computer, bookmarks for the media item based on the input and the timestamps, wherein the bookmarks indicate the specific points in the media item;
   generating, with the computer, a timeline of the bookmarks for the media item;
   forming, with the computer, a plurality of time periods based on the timestamps;
   for each of the plurality of the time periods, generating, with the computer, a level-of-interest value for each of the plurality of time periods based on a total number of bookmarks within each time period by initializing a sliding window having a duration; and for each of a plurality of positions for the sliding window, generating a level-of-interest value for a target point within the window based on a total number of bookmarks within the window; moving the sliding windows and repeated the generating step and moving steps until the end of the media item is reached; and
   outputting, with the computer, a level-of-interest curve having a first axis representing the timeline and a second axis representing the generated level-of-interest values.

2. The computer implemented method of claim 1, wherein: the media item comprises a stored representation of a live event.

3. The computer implemented method of claim 2, wherein the live event comprises at least one selected from the group consisting of:
   a presentation; and
   a meeting.

4. The computer implemented method of claim 2, wherein: receiving input comprises receiving input from attendees of the live event.

5. The computer implemented method of claim 1, wherein the media item comprises at least one selected from the group consisting of:
   a recording of an entertainment event;
   a recording of a medical procedure;
   a recorded demonstration;
   a motion picture;

a video program;
an audio program; and
an audiovisual program.

6. The computer implemented method of claim 1, wherein:
receiving input comprises receiving input from viewers of the media item.

7. The computer implemented method of claim 1, wherein:
receiving input comprises receiving input from listeners of the media item.

8. The computer implemented method of claim 1, wherein:
receiving input comprises receiving input indicating sections pertaining to particular subject matter.

9. The computer implemented method of claim 1, further comprising:
using a smoothing function to adjust at least a subset of the generated level-of-interest values.

10. The computer implemented method of claim 1, further comprising:
using a smoothing function to adjust at least a subset of the generated level-of-interest values.

11. The computer implemented method of claim 1, wherein generating a level-of-interest value for the target point comprises:
for each bookmark within the window, weighting the bookmark according to the time difference between the bookmark and the target point; and
combining the weighted bookmarks.

12. The computer implemented method of claim 1, wherein generating the level-of interest value for one of the plurality of the time periods comprises:
initializing a sliding window having a duration and a step size;
generating a level-of-interest value for a target point within the window based on a total number of bookmarks within the window;
moving the sliding window by the step size; and
repeating the generating and moving steps until the end of the media item is reached.

13. The computer implemented method of claim 12, wherein generating a level-of-interest value for the target point comprises:
for each bookmark within the window, weighting the bookmark according to the time difference between the bookmark and the target point; and
combining the weighted bookmarks.

14. The computer implemented method of claim 12, further comprising:
using a smoothing function to adjust at least a subset of the generated level-of-interest values.

15. The computer implemented method of claim 1 further comprising receiving input specifying at least two types of bookmarks for the derived bookmarks.

16. The computer implemented method of claim 1, wherein:
outputting the level-of-interest curve comprises outputting a representation of the generated level-of-interest values for each of the bookmark types.

17. The computer implemented method of claim 1, further comprising:
filtering the bookmarks according to the bookmark type; and
aggregating the bookmarks corresponding to each bookmark type, to generate level-of-interest values for each bookmark type; and
wherein outputting the level-of-interest curve comprises outputting a representation of the generated level-of-interest values for each bookmark type.

18. The computer implemented method of claim 1, further comprising:
receiving a selection of one of the users;
and wherein generating level-of-interest values comprises:
filtering the bookmarks according to the user; and
aggregating the bookmarks corresponding to the selected user, to generate level-of-interest values for the selected user;
and wherein outputting the level-of-interest curve comprises outputting a representation of the generated level-of-interest values for the selected user.

19. The computer implemented method of claim 18, wherein generating level-of-interest values comprises combining the level-of-interest values for all the specific points to generate overall level-of-interest values for the media item.

20. The computer implemented method of claim 1, wherein receiving input comprises receiving notes relating to the media item.

21. The computer implemented method of claim 20, further comprising:
storing a representation of the received notes.

22. The computer implemented method of claim 21, further comprising:
associating the stored representation of the received notes with a stored representation of the media item.

23. The computer implemented method of claim 21, further comprising:
transmitting a message comprising the received notes.

24. The computer implemented method of claim 21, wherein receiving input further comprises, for at least a subset of the received notes, receiving an indication that the notes are private, the method further comprising:
transmitting a message comprising notes not indicated as being private.

25. The computer implemented method of claim 1, further comprising:
storing a representation of the generated level-of-interest values.

26. The computer implemented method of claim 25, further comprising:
associating the stored representation of the generated level-of-interest values with a stored representation of the media item.

27. The computer implemented method of claim 1, further comprising:
storing a representation of the bookmarks.

28. The computer implemented method of claim 27, further comprising:
associating the stored representation of the bookmarks with a stored representation of the media item.

29. The computer implemented method of claim 1, wherein receiving input comprises receiving input via a wireless device.

30. The computer implemented method of claim 1, further comprising:
transmitting a message comprising the generated level-of-interest values.

31. The computer implemented method of claim 30, wherein:
transmitting the message comprises transmitting the message to the plurality of users from whom input was received.

32. The computer implemented method of claim 30, wherein:
the media item comprises a stored representation of a live event; and transmitting the message comprises transmitting the message to attendees of the live event.

33. The computer implemented method of claim 30, wherein:
transmitting the message comprises transmitting the message to a predefined group of users.

34. The computer implemented method of claim 1, further comprising:
transmitting a message comprising a representation of the media item and the generated level-of-interest values.

35. The computer implemented method of claim 1, further comprising:
transmitting a message comprising a link to the media item and the generated level-of- interest values.

36. The computer implemented method of claim 1, wherein the media item comprises a collection of time-synchronized media items.

37. A computer program product for generating a series of level-of-interest values for a media item, comprising:
a computer-readable medium; and
computer program code, encoded on the medium, for:
receiving input indicating interest in a specific point within the media item from a plurality of users, the input being one from the group of keystrokes, audio input and video input, wherein the media item comprises a presentation or a live event;
timestamping the input;
deriving bookmarks for the media item based on the input and the timestamps, wherein the bookmarks indicate the specific points in the media item;
generating a timeline of the bookmarks for the media item;
for each of the plurality of the time periods, generating, with the computer, a level-of-interest value for the time period based on a total number of bookmarks within each time period by initializing a sliding window having a duration; and for each of a plurality of positions for the sliding window, generating a level-of-interest value for a target point within the window based on a total number of bookmarks within the window;
moving the sliding windows and repeated the generating step and moving steps until the end of the media item is reached; and
outputting, with the computer, a level-of-interest curve having a first axis representing the timeline and a second axis representing the generated level-of-interest values.

38. The computer program product of claim 37, wherein the media item comprises at least one selected from the group consisting of:
a recording of an entertainment event;
a recording of a medical procedure;
a recorded demonstration;
a motion picture;
a video program;
an audio program; and
an audiovisual program.

39. The computer program product of claim 37, wherein the computer program code for receiving input comprises computer program code for receiving input from viewers of the media item.

40. The computer program product of claim 37, wherein the computer program code for receiving input comprises computer program code for receiving input from listeners of the media item.

41. The computer program product of claim 37, wherein:
the computer program code for generating level-of-interest values comprises computer program code for combining the level-of-interest values for all the specific points to generate overall level-of-interest values for the media item.

42. A system for generating a series of level-of interest values for a media item, comprising:
at least one input device, for receiving input indicating interest in a specific point within the media item from a plurality of users, the input being one from the group of keystrokes, audio input and video input, wherein the media item comprises a presentation or a live event;
a software module, coupled to the at least one input device, for timestamping the input; deriving bookmarks for the media item based on the input and the timestamps, wherein the bookmarks indicate the specific points in the media item, determining a timeline of the bookmarks for the media item, forming a plurality of time periods based on the timestamps, and for each of the plurality of the time periods, generating with the computer, a level-of-interest value for the time period based on a total number of bookmarks within the time period by initializing a sliding window having a duration; and for each of a plurality of positions for the sliding window, generating a level-of-interest value for a target point within the window based on a total number of bookmarks within the window;
moving the sliding windows and repeated the generating step and moving steps until the end of the media item is reached; and
an output device, coupled to the software module, for outputting a level-of interest curve having a first axis representing the timeline and a second axis representing the generated level-of-interest values.

43. The system of claim 42, wherein the media item comprises at least one selected from the group consisting of:
a recording of an entertainment event;
a recording of a medical procedure;
a recorded demonstration;
a motion picture;
a video program;
an audio program; and
an audiovisual program.

44. The system of claim 42, wherein:
the at least one input device receives input from viewers of the media item.

45. The system of claim 42, wherein:
the at least one input device receives input from listeners of the media item.

46. The system of claim 42, wherein the software module combines the users' level-of-interests values for all the specific points to generate overall level-of-interest values for the media item.

47. The system of claim 42, wherein the output device outputs a level-of-interest curve having a first axis representing the timeline and a second axis representing the generated level-of-interest values relative.

* * * * *